Patented Dec. 31, 1935

2,026,092

UNITED STATES PATENT OFFICE 2,026,092

DYESTUFFS OF THE OXAZINE SERIES AND PROCESS OF PREPARING THEM

Georg Kränzlein and Heinrich Greüne, Frankfort-on-the-Main-Höchst, and Max Thiele, Frankfort-on-the-Main, Germany, assignors to General Aniline Works, Inc., New York, N. Y., a corporation of Delaware No Drawing. Application May 18, 1929, Serial No. 364,316. Renewed May 1, 1935. In Germany June 6, 1928

8 Claims. (Cl. 260—28)

The present invention relates to dyestuffs and to a process of preparing them.

We have found as a surprising fact that benzoquinones of the following formula:

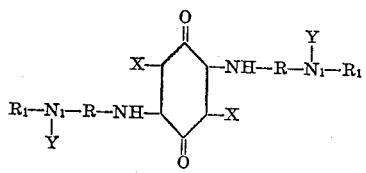

wherein X stands for hydrogen or halogen, Y for hydrogen or alkyl and R and $R_1$ for an aromatic group of the benzene- or naphthalene series, one of the R's being an aromatic group of the benzene series, or R, $R_1$ and $N_1$ together stand for a carbazole-ring-system, do not yield, when being treated as such alone or with the addition of an oxidizing agent and, if necessary, of a catalyst with high-boiling solvents, reddish, but especially bluish condensation products, from which, by sulfonation, water-soluble dyestuffs are obtained which dye the fiber valuable blue, bluish-gray or bluish-green tints.

To perform the reaction there may be used as high-boiling solvents nitrobenzene, trichlorobenzene or the like, as oxidizing agents potassium ferricyanide, pyrolusite, ferric chloride or similar products and as catalysts there may be used phosphorus pentachloride, antimony pentachloride and others more. The sulfonation may preferably be carried out by means of fuming sulfuric acid or concentrated sulfuric acid.

Instead of first condensing and then introducing the sulfo group by a subsequent operation as above stated it is, of course, also possible to introduce the sulfo group already before the oxazine has been formed, by starting for instance from an amino- diaryl-amino- or amino-carbazole-sulfonic acid.

Our invention leads to new valuable dyestuffs which probably have the following constitution:

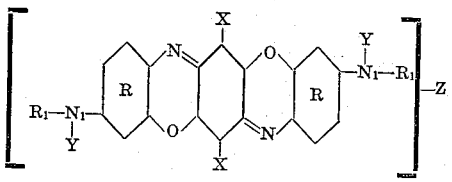

wherein Z means that the dyestuff is sulfonated, X stands for hydrogen or halogen, Y for hydrogen or alkyl and $R_1$ for an aromatic group of the benzene- or naphthalene series, or $R_1$, the R-nucleus and the nitrogen atom $N_1$ together stand for a carbazole-ring-system, the position of the sulfo group being undetermined.

Both by their excellent fastness to light and their remarkable shades these new blue, bluish-gray and bluish-green dyestuffs are particularly valuable for dyeing silk.

When reacting upon the said new sulfonated dyestuffs in the manner indicated in U. S. Patent No. 1,800,299, with the bases characterized in the said patent, blue, bluish-gray and bluish-green dye-pigments are obtained which are very suitable as nitrocellulose (varnish) -, cellon- and alcohol lacquers.

The following examples serve to illustrate our invention but they are not intended to limit it thereto, the parts being by weight.

(1) 148 parts of 2.5-di-(N-ethylcarbazolyl-3'-amino)-3.6-dichloro-1.4 benzoquinone are heated to boiling temperature with 1500 parts of nitrobenzene until the intensity of the coloration does no longer increase. After cooling, the condensation product which has crystallized out is filtered by suction, washed with alcohol and dried. It forms a crystalline product showing a greenish glittering surface luster and dissolving in concentrated sulfuric acid first to a violet blue solution which, when heated, readily turns olive. When sulfonating the product by means of sulfuric acid or fuming sulfuric acid a sulfonic acid is obtained which has the following probable constitution:

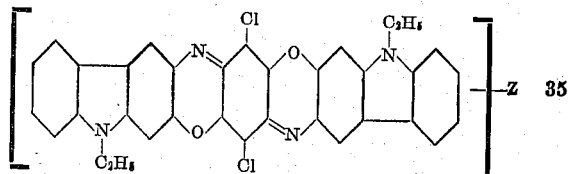

wherein Z means that the dyestuff is sulfonated and which dyes wool and silk beautiful blue tints of a very good fastness to light.

By adding a few parts of potassium ferricyanide or ferric chloride to the nitrobenzene or by using instead of nitrobenzene another solvent as for instance trichlorobenzene, the same condensation product is obtained in a shorter time and with a better yield. The condensation may, of course, also be carried out by using as starting material sulfonated 2.5-di-(N-ethyl-carbazolyl-3' - amino) -3.6-dichloro - 1.4 - benzoquinone. In this case the dyestuff-sulfonic acid is directly obtained.

The 2.5-di-(N-ethylcarbazolyl-3'-amino)-3.6-dichloro-1.4-benzoquinone which is used in the foregoing example as starting material has been prepared by condensing chloranil with 3-amino-N-ethyl-carbazole. It forms a dark brown powder melting at a temperature of above 300° C., dissolving in concentrated sulfuric acid to a blue solution, being insoluble in alcohol and sparingly soluble in xylole and glacial acetic acid.

(2) 100 parts of 2.5-di(-para-aminodiphenylamino-)3.6-dichloro-1.4-benzoquinone are heated to boiling temperature for 8 hours with 12 parts of phosphorus pentachloride and 5 parts of pyrolusite in 1000 parts of nitrobenzene. After cooling, the separated condensation product is filtered by suction, subsequently washed with alcohol and dried.

It forms a crystalline powder showing a violet luster on its surface, is insoluble in water, somewhat soluble in benzene to a reddish-violet solution, sparingly soluble in alcohol to a blue and in nitrobenzene to a brownish-violet solution. By sulfonating it by means of sulfuric acid or fuming sulfuric acid a sulfonic acid is obtained which dyes silk and wool blue tints of very good fastness to light and which has also in aqueous or saliferous solution a great affinity to the ordinary or previously mordanted textile fiber.

The 2,5-di(-para-aminodiphenylamino-) 3,6-dichloro-1.4-benzoquinone used as starting material in the preceding example has been prepared by condensing chloranil with para-amino-diphenylamine in the presence of alcohol. It forms a blackish-brown powder melting at a temperature of about 300° C., being insoluble in alcohol and glacial acetic acid, sparingly soluble in orthodichlorobenzene.

Instead of para-aminodiphenylamine there may also be used in example 2 para-amino-N-methyldiphenylamine, meta-amino-diphenylamine, aminophenyl-alpha-naphthylamine, aminophenyl-beta-naphthylamine, aminonaphthylphenylamine, aminocarbazoles or the like.

We claim:
1. The process which comprises heating a compound of the general formula:

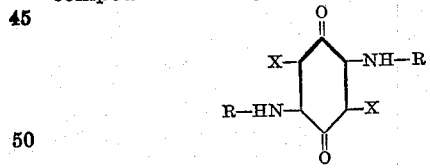

wherein X stands for hydrogen or halogen, and R for a carbazole radical which is bound at a nuclear carbon atom, has at least one unsubstituted adjacent nuclear carbon atom and may be alkylated in its nitrogen atom, in a high-boiling solvent and then sulfonating the compound thus obtained.

2. The process which comprises heating in the presence of an oxidizing agent a compound of the general formula:

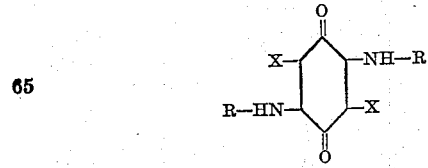

wherein X stands for hydrogen or halogen, and R for a carbazole radical which is bound at a nuclear carbon atom, has at least one unsubstituted adjacent nuclear carbon atom and may be alkylated in its nitrogen atom, in a high-boiling solvent and then sulfonating the compound thus obtained.

3. The process which comprises heating in the presence of an oxidizing agent and of a catalyst of the group consisting of phosphorus pentachloride and antimony chloride, a compound of the general formula:

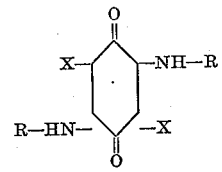

wherein X stands for hydrogen or halogen, and R for a carbazole radical which is bound at a nuclear carbon atom, has at least one unsubstituted adjacent nuclear carbon atom and may be alkylated in its nitrogen atom, in a high-boiling solvent and then sulfonating the compound thus obtained.

4. The process which comprises heating a compound of the following formula:

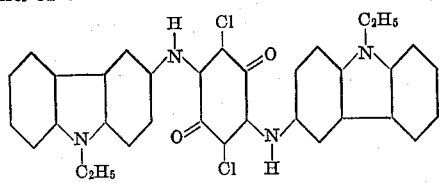

in nitrobenzene and then sulfonating the compound thus obtained.

5. The process which comprises heating in the presence of ferric chloride a compound of the following formula:

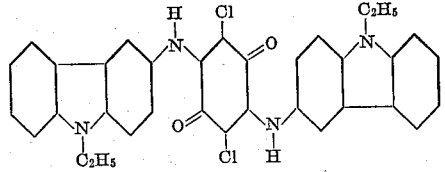

in nitrobenzene and then sulfonating the compound thus obtained.

6. The compounds of the general formula

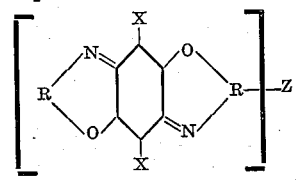

wherein Z means that the dyestuff is sulfonated, X stands for hydrogen or halogen and R for a carbazole radical which may be alkylated in its nitrogen atom and which is bound in adjacent nuclear carbon atoms to the nitrogen and oxygen atoms of the above formula, the position of the sulfo group being undetermined, dyeing wool and silk clear tints of a very good fastness to light.

7. The compounds of the general formula:

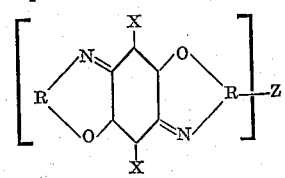

wherein Z means that the dyestuff is sulfonated, X stands for hydrogen or chlorine, R for a carbazole radical which may be ethylated in its nitrogen atom and which is bound in adjacent nuclear carbon atoms to the nitrogen and oxygen atoms of the above formula, the position of the sulfo group being undetermined, dyeing wool and silk clear tints of a very good fastness to light.
8. The compound of the following formula:
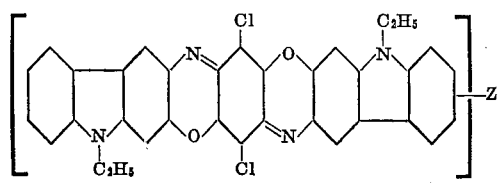
wherein Z means that the dyestuff is sulfonated dyeing the animal fiber beautiful blue tints of a very good fastness to light.
GEORG KRÄNZLEIN.
HEINRICH GREÜNE.
MAX THIELE.